(12) United States Patent
Lee

(10) Patent No.: US 12,319,279 B2
(45) Date of Patent: Jun. 3, 2025

(54) PEDESTRIAN COLLISION PREVENTION SYSTEM AND METHOD FOR VEHICLE

(71) Applicant: HYUNDAI MOBIS CO., LTD., Seoul (KR)

(72) Inventor: Hyung Myung Lee, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 350 days.

(21) Appl. No.: 17/467,927

(22) Filed: Sep. 7, 2021

(65) Prior Publication Data

US 2022/0073067 A1 Mar. 10, 2022

(30) Foreign Application Priority Data

Sep. 9, 2020 (KR) .......................... 10-2020-0115580

(51) Int. Cl.
| | |
|---|---|
| *B60W 30/095* | (2012.01) |
| *B60W 10/18* | (2012.01) |
| *B60W 30/09* | (2012.01) |
| *B60W 40/04* | (2006.01) |
| *B60W 50/14* | (2020.01) |

(52) U.S. Cl.
CPC ........ *B60W 30/0956* (2013.01); *B60W 10/18* (2013.01); *B60W 30/09* (2013.01); *B60W 40/04* (2013.01); *B60W 50/14* (2013.01); *B60W 2050/143* (2013.01); *B60W 2554/20* (2020.02); *B60W 2554/4029* (2020.02)

(58) Field of Classification Search
CPC ....... B60R 21/0134; B60W 50/14; B60T 7/22
See application file for complete search history.

(56) References Cited

U.S. PATENT DOCUMENTS

| | | | | |
|---|---|---|---|---|
| 9,950,667 | B2* | 4/2018 | Lee ........................ | B60W 50/14 |
| 10,246,038 | B2* | 4/2019 | Shima ................. | B60R 21/0134 |
| 10,717,434 | B2* | 7/2020 | You ........................ | B60W 30/08 |
| 11,167,736 | B2* | 11/2021 | Kim ....................... | B60W 30/09 |
| 2012/0008129 | A1* | 1/2012 | Lu .......................... | G01S 7/4802 |
| | | | | 356/5.01 |
| 2014/0324286 | A1* | 10/2014 | Tsuchida ............... | B60W 30/09 |
| | | | | 701/36 |

(Continued)

FOREIGN PATENT DOCUMENTS

| | | | |
|---|---|---|---|
| JP | 2006160147 A | * | 6/2006 |
| JP | 2007-329762 A | | 12/2007 |

(Continued)

OTHER PUBLICATIONS

KR20170010426A machine translation (Year: 2017).*

(Continued)

*Primary Examiner* — Navid Z. Mehdizadeh
*Assistant Examiner* — Oliver Tan
(74) *Attorney, Agent, or Firm* — NSIP Law

(57) ABSTRACT

A pedestrian collision prevention system of a vehicle including a detection unit to detect one or both of a fixed object and a pedestrian located in a vicinity of the vehicle; a prediction unit to predict a collision possibility with the pedestrian based on one or both of the fixed object and the pedestrian detected by the detection unit; and a control unit to set a detection sensitivity based on the collision possibility predicted by the prediction unit and to control one or both of generation of a warning signal and driving of the vehicle based on the detection sensitivity.

14 Claims, 8 Drawing Sheets

(56) References Cited

U.S. PATENT DOCUMENTS

2017/0217394 A1* 8/2017 Shima ................... G08G 1/16
2018/0339704 A1* 5/2018 Jo ........................... B60T 7/22

FOREIGN PATENT DOCUMENTS

| | | | | | |
|---|---|---|---|---|---|
| JP | 2009174900 | A | * | 8/2009 | |
| JP | 2016-45903 | A | | 4/2016 | |
| KR | 20170010426 | A | * | 1/2017 | |
| KR | 20200039065 | A | * | 10/2018 | ............ B60W 30/08 |
| KR | 10-2018-0130185 | A | | 12/2018 | |
| KR | 10-2020-0039065 | A | | 4/2020 | |
| WO | WO-2021049790 | A1 | * | 3/2021 | ......... B60R 21/0134 |

OTHER PUBLICATIONS

WO-2021049790-A1 machine translation (Year: 2020).*
JP-2009174900-A machine translation (Year: 2009).*
Korean Office Action issued on Oct. 12, 2021 in counterpart Korean Patent Application No. 10-2020-0115580 (5 pages in Korean).

* cited by examiner

PEDESTRIAN COLLISION PREVENTION SYSTEM AND METHOD FOR VEHICLE

CROSS-REFERENCE TO RELATED APPLICATION

The present application claims priority to Korean Patent Application No. 10-2020-0115580, filed Sep. 9, 2020, the entire contents of which is incorporated herein for all purposes by this reference.

BACKGROUND OF THE INVENTION

Field of the Invention

The present invention relates to a pedestrian collision prevention system of a vehicle. More particularly, the present invention relates to a technique of detecting a fixed object or a pedestrian in the vicinity of the vehicle and preventing a collision between the vehicle and the pedestrian.

Description of the Related Art

As an advanced driver assistance system (ADAS) mounted in a vehicle has gradually developed, functions for preventing life-threatening accidents have been greatly improved along with technological developments in recent years. A typical example is a system, mounted in a vehicle, that identifies a pedestrian by recognizing an image captured by a camera, warns of a risk of collision with the pedestrian, and in some cases, executes emergency braking, thereby preventing a life-threatening accident.

The technique of pedestrian recognition and collision avoidance has developed to the point where a pedestrian approaching at a speed of 4 km/h or faster on the sidewalk of the driving lane of the vehicle or a pedestrian approaching at a speed of 8 km/h or faster on the opposite sidewalk is quickly identified, and the driver is made to manipulate brake immediately or emergency braking is executed.

The conventional pedestrian collision prevention system of the vehicle could detect a pedestrian on the move in the vicinity of the vehicle and generate a warning signal or stop the vehicle if a collision between the vehicle and the pedestrian was predicted based on the detected pedestrian.

However, in a parking lot where a large number of vehicles are located or in an area where a large number of obstacles are located, there was a problem that a pedestrian appeared too unexpectedly to recognize or was recognized too late to avoid a collision with the pedestrian even if emergency braking was applied.

The matters described above as the technical background are intended only for a better understanding of the background of the present invention and should not be taken as an acknowledgment that they pertain to the conventional art already known to those skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a pedestrian collision prevention system of a vehicle includes: a detection unit configured to detect one or both of a fixed object and a pedestrian located in a vicinity of the vehicle; a prediction unit configured to predict a collision possibility with the pedestrian based on one or both of the fixed object and the pedestrian detected by the detection unit; and a control unit configured to set a detection sensitivity based on the collision possibility predicted by the prediction unit and to control one or both of generation of a warning signal and driving of the vehicle based on the detection sensitivity.

The system may include a location checking unit configured to check location information of the vehicle, and the control unit may be configured to generate the warning signal or raise the detection sensitivity of the detection unit in a case in which the location checking unit determines that the vehicle is in a pre-stored driving warning zone.

The control unit may be configured to generate the warning signal or raise the detection sensitivity of the detection unit in a case in which the collision possibility between the pedestrian and the vehicle is predicted by the prediction unit based on the fixed object.

The control unit may be configured to generate a preload in a vehicle brake in a case in which the collision possibility with the pedestrian is predicted by the prediction unit in a state in which the warning signal is generated or the detection sensitivity of the detection unit is equal to or higher than a predetermined level.

The control unit may be configured to generate the warning signal or raise the detection sensitivity of the detection unit in a case in which the pedestrian is detected by the detection unit for a predetermined time or longer.

The control unit may be configured to set a pedestrian variation index based on a number of pedestrians detected by the detection unit in a state in which the warning signal is generated or the detection sensitivity of the detection unit is equal to or higher than a predetermined level, and to generate a preload in a vehicle brake in a case in which the pedestrian variation index is equal to or higher than a predetermined value.

The prediction unit may be configured to classify the pedestrian into an adult or a child in predicting the collision possibility, and the control unit may be configured to set a greater weight for a child than an adult in the pedestrian variation index.

The detection unit may be connected to a radar sensor or a camera sensor mounted in the vehicle to detect one or both of the fixed object and the pedestrian located in the vicinity of the vehicle.

In another general aspect, a pedestrian collision prevention method of a vehicle includes: detecting one or both of a fixed object and a pedestrian located in a vicinity of the vehicle; predicting a collision possibility with the pedestrian based on the detecting; and setting a detection sensitivity based on the collision possibility and controlling one or both of generation of a warning signal and driving of the vehicle based on the detection sensitivity.

The method may include checking location information of the vehicle, and the warning signal may be generated or the detection sensitivity may be raised in a case in which it is determined that the vehicle is located in a pre-stored driving warning zone.

The warning signal may be generated or the detection sensitivity may be raised in a case in which the collision possibility between the pedestrian and the vehicle is predicted based on the fixed object.

A preload may be generated in a vehicle brake in a case in which the collision possibility with the pedestrian is predicted in a state in which the warning signal is generated or the detection sensitivity is equal to or higher than a predetermined level.

The warning signal may be generated or the detection sensitivity may be raised in in a case in which the pedestrian is detected for a predetermined time or longer.

The method may include setting a pedestrian variation index based on a number of pedestrians detected and determining whether the pedestrian variation index is equal to or higher than a predetermined value, and a preload may be generated in a vehicle brake in in a case in which the pedestrian variation index is determined to be equal to or higher than the predetermined value in a state in which the warning signal is generated and the detection sensitivity is equal to or higher than a predetermined level.

The pedestrian may be classified into an adult or a child in predicting the collision possibility, and a weight of the pedestrian variation index may be set greater for the child than the adult.

A radar sensor or a camera sensor may be mounted in the vehicle and may be configured to detect the fixed object and the pedestrian.

Other features and aspects will be apparent from the following detailed description, the drawings, and the claims.

DETAILED DESCRIPTION OF THE INVENTION

Figure 1:
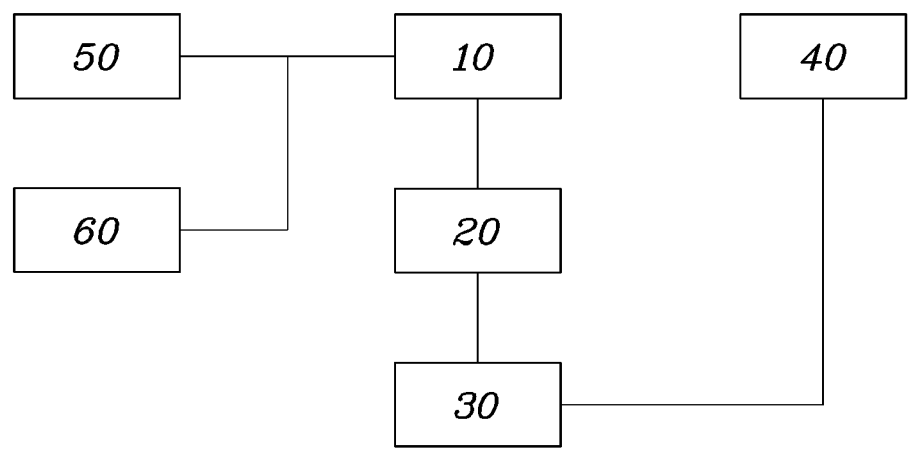
FIG. 1 is a block diagram showing a pedestrian collision prevention system of a vehicle according to an embodiment of the present invention.

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiment of the present invention may be modified in various ways and have various forms, specific embodiments will be illustrated in the drawings and described in the present specification or application. However, this is not intended to limit the embodiments according to the concept of the present invention to the specific forms and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there are no intervening components present. Other expressions describing the relationship between components such as "between" and "just between", or "adjacent to" and "directly adjacent to" should be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and should not be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, should be interpreted as having a meaning that is consistent with their meaning in the context of the present specification, and will not be interpreted in an idealized or overly formal sense unless expressly so defined herein.

In the following, the present invention will be described in detail by describing preferred embodiments of the present invention with reference to the accompanying drawings.

A detection unit 10, a prediction unit 20, a control unit 30, and a location checking unit 40 according to an exemplary embodiment of the present invention may be implemented through a processor (not shown) configured to perform operations to be described below using an algorithm configured to control the operations of various components of a vehicle 100 or a nonvolatile memory (not shown) configured to store data relating to software commands for reproducing the algorithm and the data stored in the memory. Here, the memory and the processor may be implemented as individual chips. Alternatively, the memory and the processor may be implemented as an integrated single chip. The processor may take the form of one or more processors.

Figure 2:
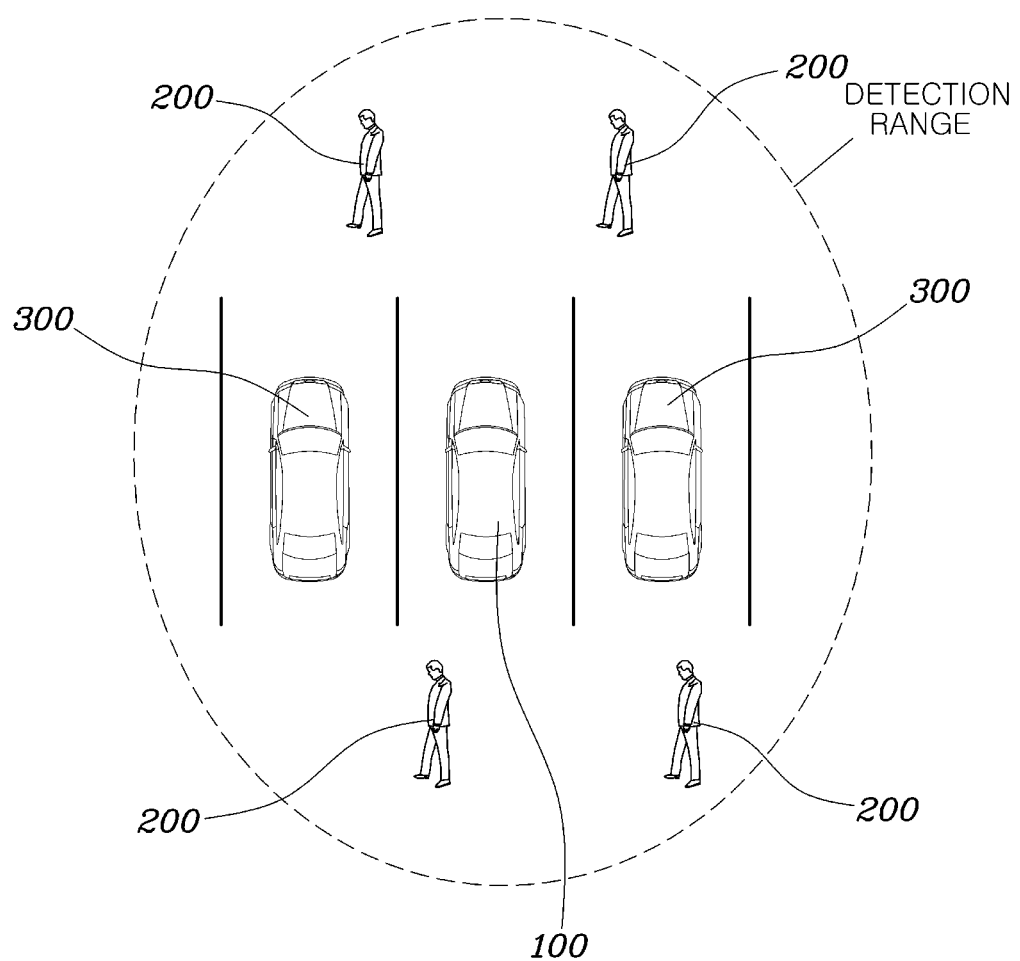
FIG. 2 is a view showing a state in which a pedestrian and a fixed object are detected in a pedestrian collision prevention system of a vehicle according to an embodiment of the present invention.
Figure 3:
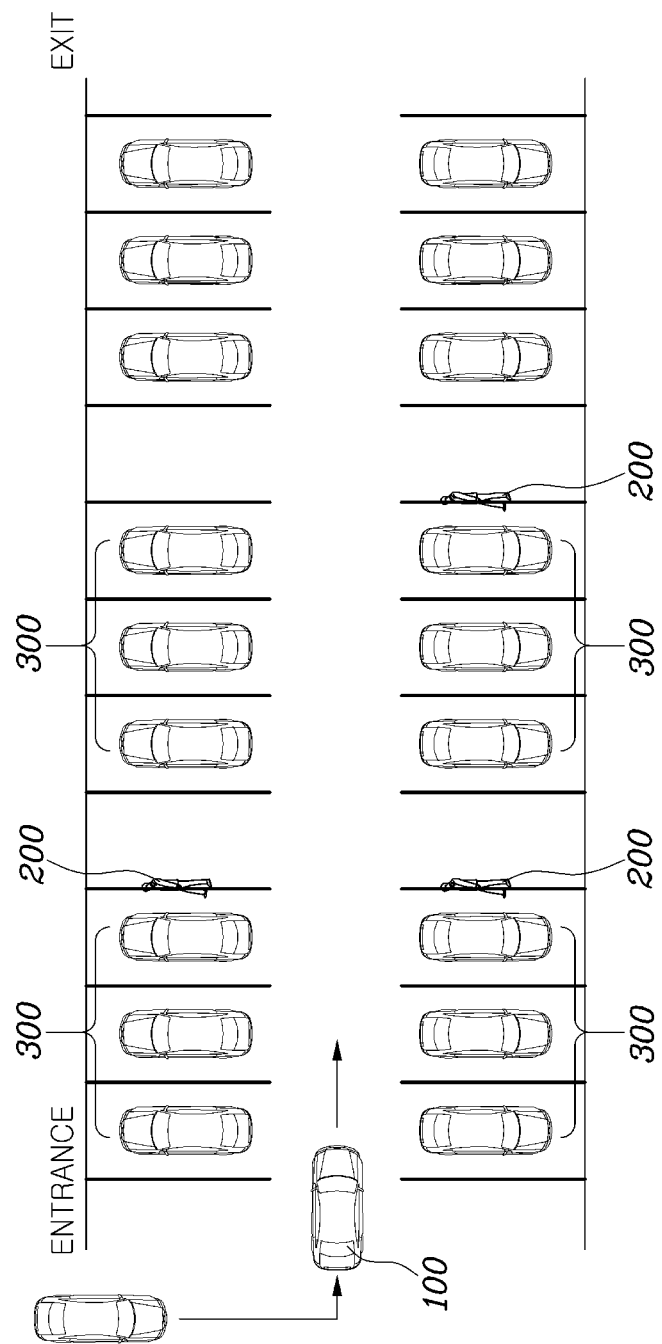
FIG. 3 is a view showing a vehicle entering a parking area in a pedestrian collision prevention system of a vehicle according to an embodiment of the present invention.
Figure 4:
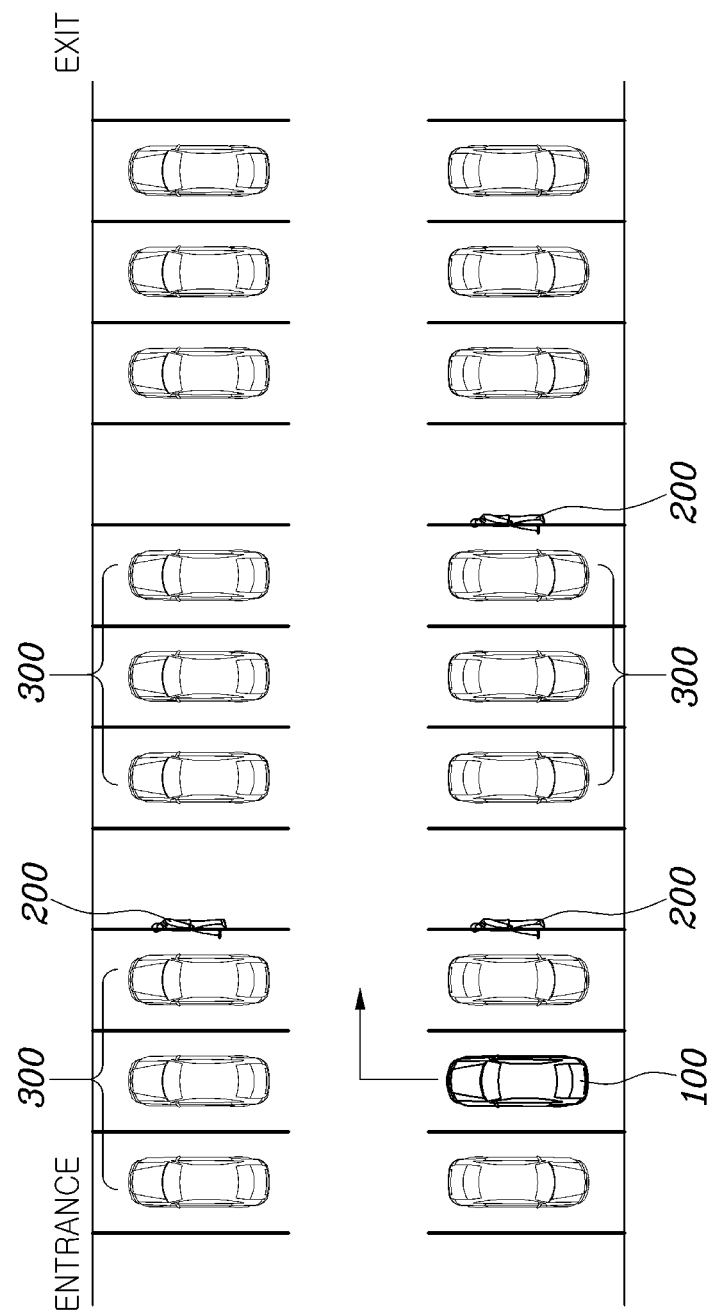
FIG. 4 is a view showing a vehicle leaving from a parked state in a pedestrian collision prevention system of a vehicle according to an embodiment of the present invention.
Figure 5:
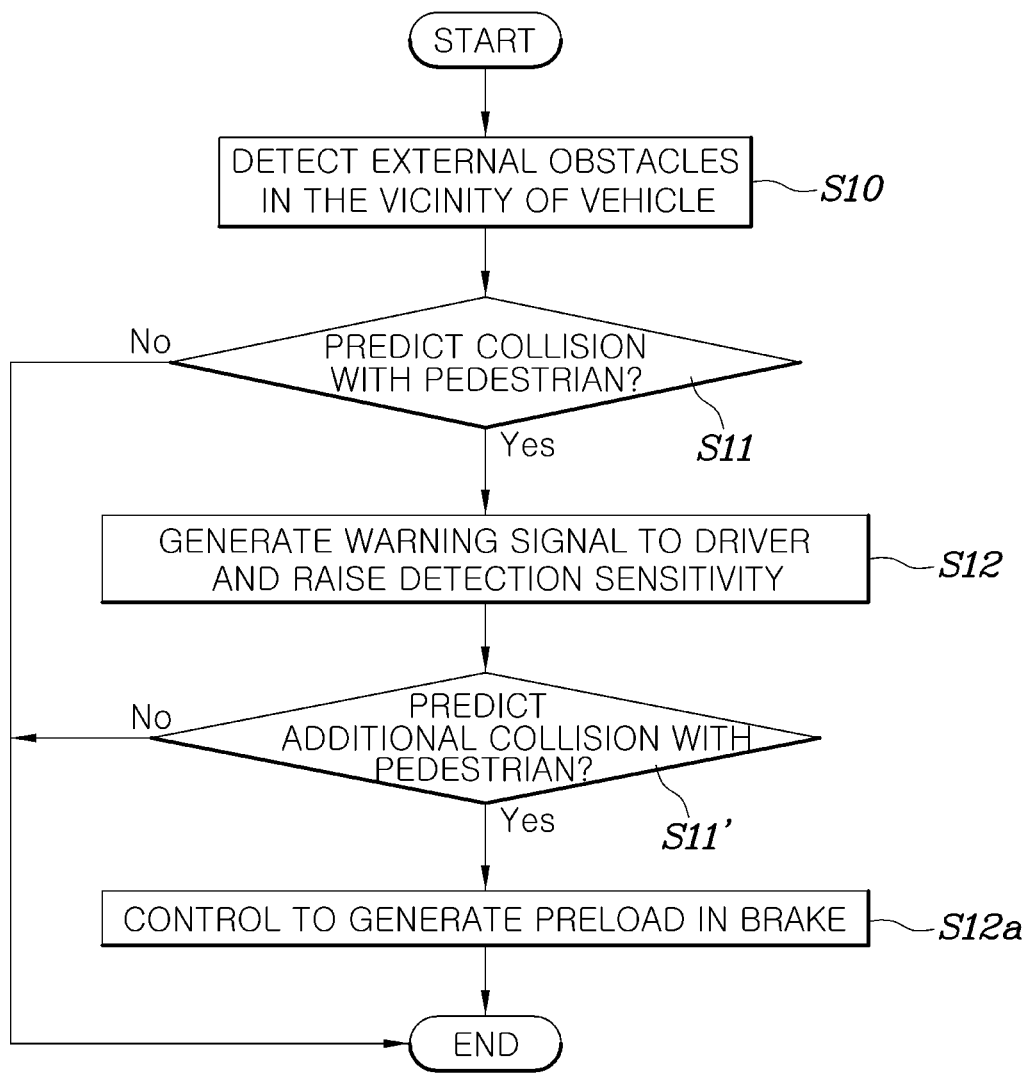
FIGS. 5 to 8 are flowcharts of first to fourth embodiments of a pedestrian collision prevention method of a vehicle according to embodiments of the present invention.
Figure 6:
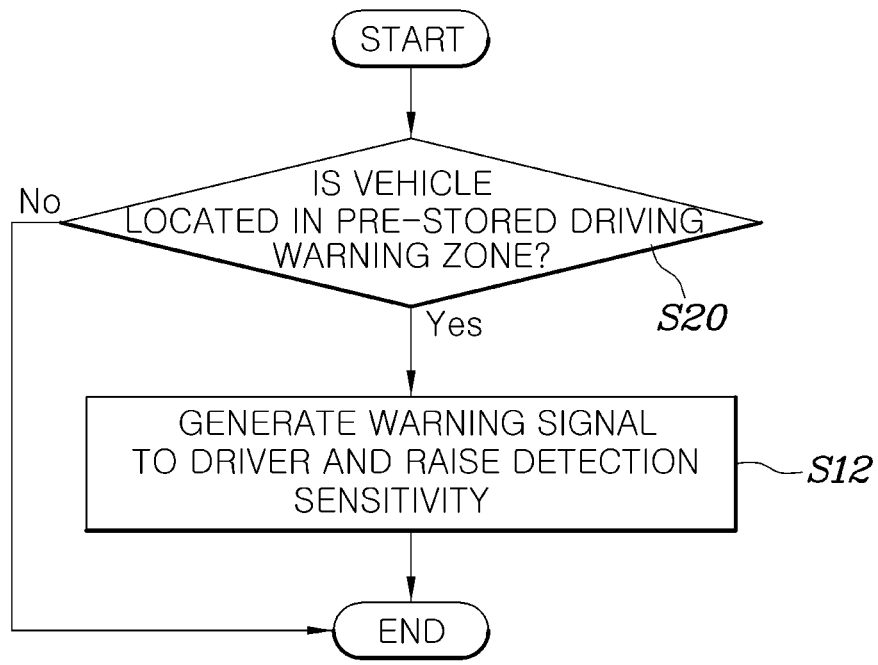
Figure 7:
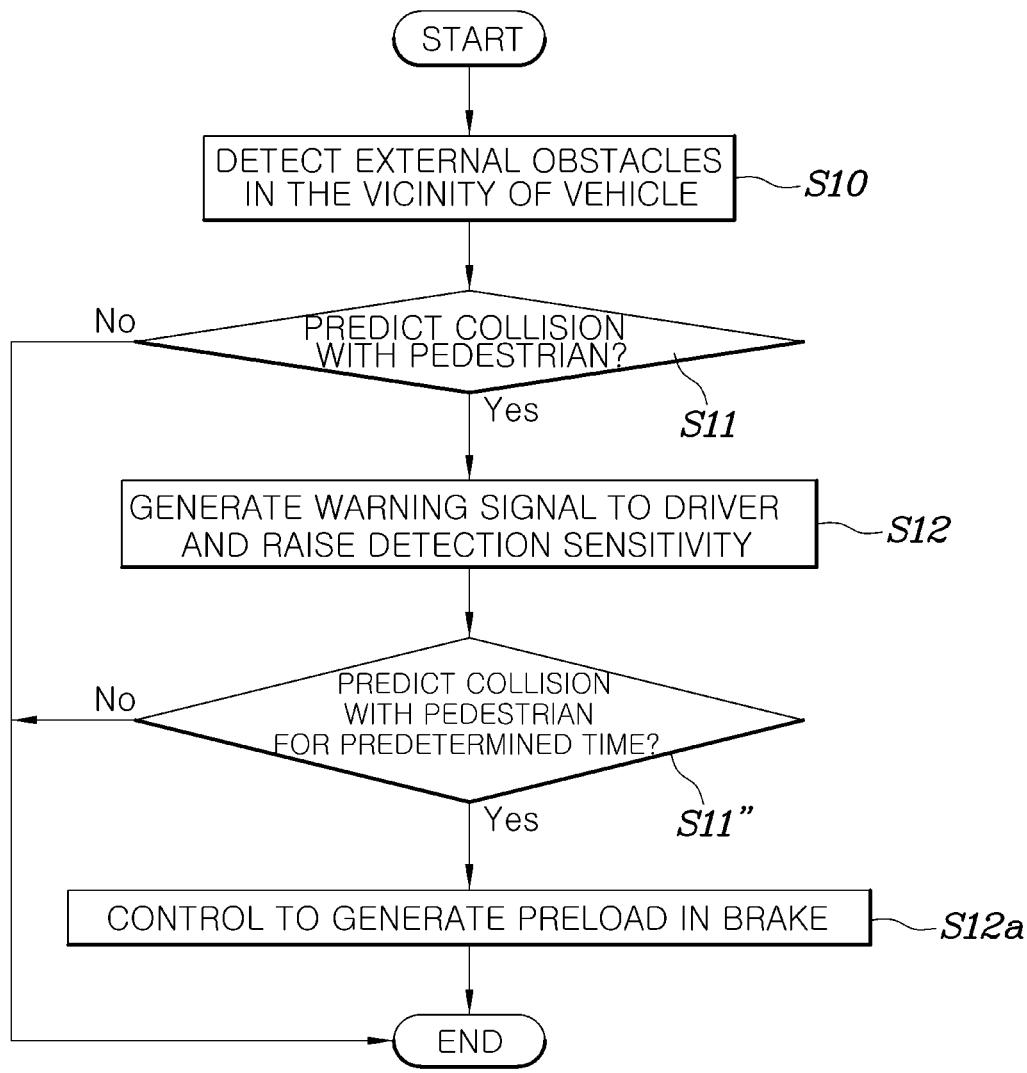
Figure 8:
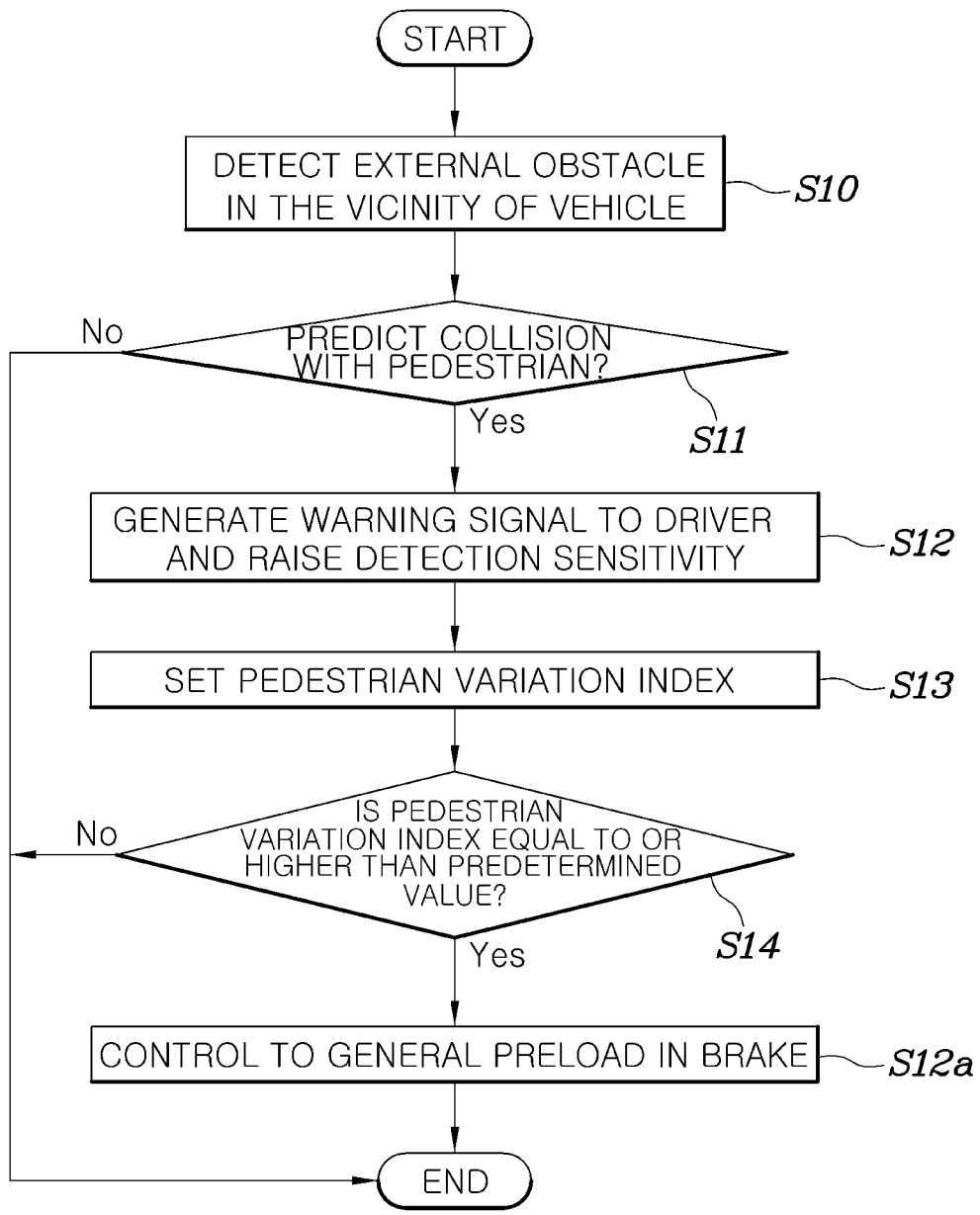

FIG. 1 is a block diagram showing a pedestrian 200 collision prevention system of a vehicle 100 according to an embodiment of the present invention, FIG. 2 is a view showing a state in which a pedestrian 200 and a fixed object 300 are detected in a pedestrian 200 collision prevention system of a vehicle 100 according to an embodiment of the present invention, FIG. 3 is a view showing a vehicle 100 entering a parking area in a pedestrian 200 collision prevention system of a vehicle 100 according to an embodiment of the present invention, and FIG. 4 is a view showing a vehicle 100 leaving from a parked state in a pedestrian 200 collision prevention system of a vehicle 100 according to an embodiment of the present invention.

The pedestrian 200 collision prevention system of the vehicle 100 according to the present invention is invented to prevent a collision between the pedestrian 200 and the vehicle 100 in a place where the pedestrian 200 appears between a plurality of parked or stopped vehicles 100 or between fixed obstacles while the vehicle 100 is driving or a plurality of pedestrians 200 are located.

The pedestrian 200 collision prevention system of a vehicle 100 according to the present invention includes a detection unit 10 detecting a fixed object 300 or a pedestrian 200 located in the vicinity of the vehicle 100; a prediction unit 20 predicting a collision possibility with the pedestrian 200 based on the fixed object 300 or the pedestrian 200 detected by the detection unit 10; and a control unit 30 setting detection sensitivity based on the collision possibility predicted by the prediction unit 20 and controlling the generation of a warning signal or driving of the vehicle 100 based on the detection sensitivity.

As shown in FIGS. 1 and 2, the detection unit 10 may detect the fixed object 300 and the pedestrian 200 located in the neighborhood of the vehicle 100 including the front, side, and rear of the vehicle 100, and the prediction unit 20 may predict a collision between the vehicle 100 and the pedestrian 200 who unexpectedly appears between the fixed objects 300 or the pedestrian 200 who unexpectedly moves between a plurality of pedestrians 200 based on the fixed object 300 or the movement of the pedestrian 200 detected by the detection unit 10.

The fixed object 300 may be a parked or stopped vehicle 100 close to the vehicle 100 or a fixed obstacle, and the fixed object 300 may block a driver's view to make it difficult for the driver to recognize the pedestrian.

The control unit 30 may raise the detection sensitivity, generate the warning signal of a collision with the pedestrian 200 to the driver through an instrument cluster, or generate a collision warning sound through in-vehicle speakers based on the collision possibility predicted by the prediction unit 20.

In addition, when a collision between the vehicle 100 and the pedestrian 200 is predicted by the prediction unit 20 after the detection sensitivity is raised or the warning signal is generated, the control unit 30 may control the vehicle 100 into a ready-to-brake state or control driving of the vehicle 100 to stop the vehicle 100.

A location checking unit 40 checking the location information of the vehicle 100 is further included, and the control unit 30 controls to generate the warning signal or raise the detection sensitivity of the detection unit 10 when it is checked by the location checking unit 40 that the vehicle 100 is located in a pre-stored driving warning zone.

The location checking unit 40 is connected to a device such as the GPS mounted in the vehicle 100 capable of checking the location information and may check the location of the vehicle 100. When the vehicle 100 is located in areas like a children protection zone, a senior citizen protection zone, or a parking area where careful driving is required, the control unit 30 may generate the warning signal to the driver or raise the detection sensitivity of the detection unit 10.

This has the effect of inducing the driver to driver more carefully and preventing a collision between the vehicle 100 and the pedestrian 200 as the pedestrian 200 appearing unexpectedly may be detected with the raised detection sensitivity to stop the vehicle 100.

When the prediction unit 20 predicts the collision possibility between the pedestrian 200 and the vehicle 100 based on the fixed object 300, the control unit 30 controls to generate the warning signal or raise the detection sensitivity of the detection unit 10.

The prediction unit 20 may predict the collision possibility between the vehicle 100 and the pedestrian 200 appearing unexpectedly between a plurality of fixed objects 300 based on the fixed objects 300 detected by the detection unit 10.

When the detection unit 10 detects the pedestrian 200 between the fixed object 300 and the fixed object 300 and the prediction unit 20 predicts the collision possibility with the vehicle 100 caused by the movement of the pedestrian 200 between the fixed objects 300, the control unit 30 may generate the warning signal to the driver or raise the detection sensitivity of the detection unit 10 to the predetermined level.

This has the effect of inducing the driver to drive more carefully and preventing the collision between the vehicle 100 and the pedestrian 200 as the pedestrian 200 appearing unexpectedly is detected with the raised detection sensitivity to stop the vehicle 100.

The control unit 30 controls to generate a preload in the vehicle 100 brake when the collision possibility with the pedestrian 200 is predicted by the prediction unit 20 in the state where the warning signal is generated or the detection sensitivity of the detection unit 10 is equal to or higher than the predetermined level.

The control unit 30 may control to generate the preload in the brake so that the vehicle 100 may be stopped immediately when the pedestrian 200 is detected by the detection unit 10 and the collision possibility with the pedestrian 200 is predicted by the prediction unit 20 in the state where the warning signal is generated or the detection sensitivity is raised equal to or higher than the predetermined level.

In the brake system of the vehicle 100, an operation of a brake pedal operates a hydraulic cylinder such that a contact between the brake pad and a disk may stop the vehicle 100.

The control unit 30 may control the brake system to apply the preload to the hydraulic cylinder and may immediately stop the vehicle when a collision with the pedestrian 200 is predicted.

The control unit 30 controls to generate the warning signal or raise the detection sensitivity of the detection unit 10 when the pedestrian 200 is detected by the detection unit 10 for a predetermined time or longer.

Since the collision possibility between the pedestrian 200 and the vehicle 100 arises when the pedestrian 200 is detected by the detection unit 10 for a predetermined time or longer, the control unit 30 may generate the warning signal to the driver through the instrument cluster or generate the warning sound through in-vehicle speakers and raise the detection sensitivity of a detection sensor such as a radar sensor 50 connected to the detection unit 10.

This has the effect of inducing the driver to drive more carefully or stopping the vehicle 100 as an unexpected movement of the pedestrian 200 may be detected with raised detection sensitivity.

The control unit 30 sets a pedestrian 200 variation index based on the number of pedestrians 200 detected by the detection unit 10 and controls to generate the preload in the vehicle 100 brake if the pedestrian 200 variation index is equal to or higher than the predetermined value in the state where the warning signal is generated or the detection sensitivity of the detection unit 10 is equal to or higher than the predetermined level.

When an additional pedestrian 200 is detected by the detection unit 10 in the state where the above warning signal is generated or the detection sensitivity of the detection unit 10 is equal to or higher than the predetermined level, the control unit 30 sets the pedestrian 200 variation index based on the number of pedestrians 200 detected by the detection unit 10 and may generate the preload in the vehicle 100 brake if the pedestrian 200 variation index is equal to or higher than the predetermined level.

This has the effect of allowing the preload to be applied to the brake of the vehicle 100 when a plurality of pedestrians 200 are detected while the vehicle 100 is driving and stopping the vehicle 100 immediately when the pedestrian 200 moves unexpectedly.

The prediction unit 20 classifies the pedestrian 200 into an adult or a child in predicting the collision possibility, and the control unit 30 sets a greater weight of the pedestrian 200 variation index for a child than an adult.

The prediction unit 20 distinguishes an adult from a child in predicting the collision possibility as the collision possibility with the pedestrian 200 is higher for a child than an adult, and the control unit 30 may set a greater weight of the pedestrian 200 variation index for a child than an adult in setting the pedestrian 200 variation index.

For example, the pedestrian 200 variation index may be set such that the weight of the pedestrian 200 variation index is a for an adult and 1.5a for a child.

The detection unit 10 is connected to the radar sensor 50 or the camera 60 mounted in the vehicle 100 and detects the fixed object 300 or the pedestrian 200 located in the vicinity of the vehicle 100.

The detection unit 10 is connected to a detection sensor such as the radar sensor 50 or the camera 60 mounted in the vehicle 100 to be able to detect the pedestrian 200 or the fixed object 300. A detection sensor such as a lidar sensor or an ultrasonic sensor may be employed in addition to the radar sensor 50 or the camera sensor 60.

FIGS. 5 to 8 are flowcharts of the first to fourth embodiments of a pedestrian collision prevention method of a vehicle according to embodiments of the present invention.

Preferred embodiments of the pedestrian 200 collision prevention method of the vehicle 100 according to the present invention will be described with reference to FIGS. 5 to 8.

The pedestrian 200 collision prevention method of the vehicle 100 according to the present invention includes a detection step S10 of detecting a fixed object 300 or a pedestrian 200 located in the vicinity of the vehicle 100; a prediction step S11 of predicting the collision possibility with the pedestrian 200 based on the fixed object 300 or the pedestrian 200 detected in the detection step S10; and a control step S12 of setting the detection sensitivity based on the collision possibility predicted in the prediction step S11 and controlling generation of the warning signal or driving of the vehicle 100 based on the detection sensitivity.

A location checking step S20 of checking the location information of the vehicle 100 is further included, and the warning signal is generated to the driver or the detection sensitivity in the detection step S10 is raised in the control step S12 when it is checked that the vehicle 100 is located in a pre-stored driving warning zone in the location checking step S20.

When the collision possibility between the pedestrian 200 and the vehicle 100 is predicted based on the fixed object 300 in the prediction step S11, the warning signal is generated or the detection sensitivity in the detection step S10 is raised in the control step S12.

The preload is generated in the vehicle 100 brake (S12a) in the control step S12 when the collision possibility with the pedestrian 200 is predicted (S11') in the prediction step S11 in the state where the warning signal is generated or the detection sensitivity in the detection step S10 is equal to or higher than the predetermined level.

The warning signal is generated or the detection sensitivity in the detection step S10 is raised in the control step S12 when the pedestrian 200 is detected for the predetermined time or longer (S11'') in the detection step S10.

A setting step S13 of setting the pedestrian 200 variation index based on the number of pedestrians 200 detected in the detection step S10 and a determination step S14 of determining the pedestrian 200 variation index to be equal to or higher than the predetermined value are further included. The preload is generated in the vehicle 100 brake (S12a) in the control step S12 when the pedestrian 200 variation index is determined to be equal to or higher than the predetermined value in the determination step S14 in the state where the warning signal is generated or the detection sensitivity in the detection step S10 is equal to or higher than the predetermined level.

The pedestrian 200 is classified into an adult or a child in predicting the collision possibility in the prediction step S11, and the weight of the pedestrian 200 variation index is set greater for a child than an adult in the control step S12.

The radar sensor or the camera sensor mounted in the vehicle 100 are connected and the fixed object 300 or the pedestrian 200 located in the vicinity of the vehicle 100 are detected in the detection step S10.

Specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A pedestrian collision prevention system of a vehicle, comprising:
   a detection unit implemented by one or more sensors and at least one processor, thereby configured to detect a fixed object and a pedestrian located in a vicinity of the vehicle;
   a prediction unit implemented by the at least one processor, thereby configured to, based on the fixed object and the pedestrian detected by the detection unit, predict a collision possibility with the pedestrian; and
   a control unit configured to:
      set a detection sensitivity of the detection unit based on the collision possibility;
      control both of generation of a warning signal and driving of the vehicle based on the detection sensitivity;
      set a pedestrian variation index based on a number of pedestrians detected by the detection unit when the warning signal is generated or the detection sensitivity of the detection unit is above a predetermined level;
      generate a preload on a vehicle brake when: the collision possibility with the pedestrian is predicted by the prediction unit, the warning signal is generated or the detection sensitivity of the detection unit is above the predetermined level, and the pedestrian variation index is above a predetermined value;
      determine an amount of time that the pedestrian has been located in the vicinity of the vehicle;

generate the warning signal or increase the detection sensitivity of the detection unit when the amount of time the pedestrian has been located in the vicinity of the vehicle is longer than a predetermined time; and increase a detection sensitivity of a radar sensor connected to the detection unit and configured to detect the fixed object and the pedestrian, in response to the amount of time the pedestrian has been located in the vicinity of the vehicle being longer than the predetermined time.

2. The pedestrian collision prevention system of the vehicle of claim 1, further comprising:

a location checking unit connected to a GPS and implemented by the at least one processor, thereby configured to check location information of the vehicle, wherein the control unit is configured to generate the warning signal or increase the detection sensitivity of the detection unit when the location checking unit determines that the vehicle is in a pre-stored driving warning zone.

3. The pedestrian collision prevention system of the vehicle of claim 1, wherein the control unit is configured to generate the warning signal or increase the detection sensitivity of the detection unit when the collision possibility between the pedestrian and the vehicle is predicted by the prediction unit based on the fixed object.

4. The pedestrian collision prevention system of the vehicle of claim 1, wherein the prediction unit is configured to classify the pedestrian into an adult or a child in predicting the collision possibility, and wherein the control unit is configured to set a greater weight on the child than on the adult in the pedestrian variation index.

5. The pedestrian collision prevention system of the vehicle of claim 1, wherein the detection unit is connected to a camera sensor mounted in the vehicle to detect the fixed object and the pedestrian located in the vicinity of the vehicle.

6. The pedestrian collision prevention system of the vehicle of claim 1, wherein the determined amount of time is a duration in time that the pedestrian is in the vicinity of the vehicle, wherein when the determined amount of time that the pedestrian has been located in the vicinity of the vehicle is shorter than the predetermined time, the control unit is configured so that the detection sensitivity of the detection unit is not increased and the warning signal is not generated, and wherein when the determined amount of time that the pedestrian has been located in the vicinity of the vehicle is above the predetermined time, the control unit is configured to increase the detection sensitivity of the detection unit or generate the warning signal.

7. A pedestrian collision prevention method of a vehicle, the method comprising:

detecting a fixed object and a pedestrian located in a vicinity of the vehicle;

predicting a collision possibility with the pedestrian based on the detecting;

setting a detection sensitivity based on the collision possibility and controlling both of generation of a warning signal and driving of the vehicle based on the detection sensitivity;

setting a pedestrian variation index based on a number of pedestrians detected by a detection unit when the warning signal is generated or the detection sensitivity of the detection unit is above a predetermined level;

generating a preload on a vehicle brake when: the collision possibility with the pedestrian is predicted by a prediction unit, the warning signal is generated or the detection sensitivity of the detection unit is above the predetermined level, and the pedestrian variation index is above the predetermined value;

determining an amount of time that the pedestrian has been located in the vicinity of the vehicle;

generating the warning signal or increasing the detection sensitivity of the detection unit when the amount of time the pedestrian has been located in the vicinity of the vehicle is longer than a predetermined time; and increasing a detection sensitivity of a radar sensor connected to the detection unit and configured to detect the fixed object and the pedestrian, in response to the amount of time the pedestrian has been located in the vicinity of the vehicle being longer than the predetermined time.

8. The pedestrian collision prevention method of the vehicle of claim 7, further comprising checking location information of the vehicle, wherein the warning signal is generated or the detection sensitivity is increased when it is determined that the vehicle is located in a pre-stored driving warning zone.

9. The pedestrian collision prevention method of the vehicle of claim 7, wherein the warning signal is generated or the detection sensitivity is increased when the collision possibility between the pedestrian and the vehicle is predicted based on the fixed object.

10. The pedestrian collision prevention method of the vehicle of claim 7, wherein the predicting of the collision possibility with the pedestrian further comprises:

classifying the pedestrian into an adult or a child in predicting the collision possibility, and setting a greater weight on the child than on the adult in the pedestrian variation index.

11. The pedestrian collision prevention method of the vehicle of claim 7, wherein a camera sensor mounted in the vehicle is configured to detect the fixed object and the pedestrian.

12. A pedestrian collision prevention system of a vehicle, comprising:

one or more sensors configured to detect a fixed object and a pedestrian located in a vicinity of the vehicle; and one or more processors configured to:

predict a collision possibility with the pedestrian based on the fixed object and the pedestrian detected by the one or more sensors;

set a detection sensitivity of the one or more sensors based on the collision possibility;

control both of generation of a warning signal and driving of the vehicle based on the detection sensitivity;

set a pedestrian variation index based on a number of pedestrians detected by the one or more sensors when the warning signal is generated or the detection sensitivity is above a predetermined level;

generate a preload on a vehicle brake when: the collision possibility with the pedestrian is predicted, the warning signal is generated or the detection sensitivity is above the predetermined level, and the pedestrian variation index is above a predetermined value;

determine an amount of time that the pedestrian has been located in the vicinity of the vehicle;

generate the warning signal or increase the detection sensitivity of the one or more sensors when the amount of time the pedestrian has been located in the vicinity of the vehicle is longer than a predetermined time; and increase a detection sensitivity of a radar sensor mounted in the vehicle and configured to detect the fixed object and the pedestrian, in response to the amount of time the pedestrian has been located in the vicinity of the vehicle being longer than the predetermined time.

13. The pedestrian collision prevention system of the vehicle of claim 12, wherein the one or more processors are configured to;

check location information of the vehicle, and generate the warning signal or increase the detection sensitivity when the one or more processors determine that the vehicle is in a pre-stored driving warning zone.

14. The pedestrian collision prevention system of the vehicle of claim 12, wherein the one or more processors are configured to;

generate the warning signal or increase the detection sensitivity when the collision possibility between the pedestrian and the vehicle is predicted based on the fixed object.

\* \* \* \* \*